(12) United States Patent  
Chen

(10) Patent No.: US 7,494,289 B1
(45) Date of Patent: Feb. 24, 2009

(54) OPTICAL FIBRE SPLICE PROTECTOR

(75) Inventor: Yuehua Chen, Southampton (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/869,848

(22) Filed: Oct. 10, 2007

(51) Int. Cl.
*G02B 6/255* (2006.01)

(52) U.S. Cl. .............................. 385/99; 385/95; 385/96; 385/97; 385/98

(58) Field of Classification Search .............. 385/95–99
See application file for complete search history.

(56) References Cited

U.S. PATENT DOCUMENTS

| | | | |
|---|---|---|---|
| 4,509,820 A * | 4/1985 | Murata et al. .................. | 385/99 |
| 4,585,304 A * | 4/1986 | Winter et al. .................. | 385/95 |
| 6,367,990 B1 * | 4/2002 | Dumitriu ..................... | 385/99 |
| 6,446,723 B1 | 9/2002 | Ramos | |
| 6,557,630 B2 | 5/2003 | Harkins | |
| 7,155,101 B2 | 12/2006 | Shah | |
| 7,170,007 B2 | 1/2007 | Varkey | |
| 7,222,676 B2 | 5/2007 | Patel | |
| 7,248,984 B2 | 7/2007 | Hadley | |
| 7,257,301 B2 | 8/2007 | Homa | |

FOREIGN PATENT DOCUMENTS

| | | |
|---|---|---|
| GB | 2355740 A | 5/2001 |
| GB | 2355740 A8 | 3/2003 |
| GB | 2412507 A | 9/2005 |
| GB | 2436029 A | 9/2007 |
| WO | 2003098179 A1 | 11/2003 |

* cited by examiner

*Primary Examiner*—Charlie Peng
*Assistant Examiner*—Hung Lam
(74) *Attorney, Agent, or Firm*—James L. Kurka; Daryl R. Wright

(57) ABSTRACT

An optical fiber splice protector is provided which includes a first tube being substantially hollow and being locatable along a portion of the length of at least one optical fiber, the portion including a bare optical fiber section of the optical fiber. A longitudinal support is also locatable along the portion of the length of the optical fiber that includes the bare optical fiber splice section of the optical fiber, the longitudinal support being enclosable by the first tube along the length of the optical fiber. The first tube is of high temperature resistant material that is resistant to temperatures above 125 degrees Celsius.

17 Claims, 1 Drawing Sheet

OPTICAL FIBRE SPLICE PROTECTOR

TECHNICAL FIELD

The invention relates to an optical fibre splice protector. More particularly, the invention relates to an optical fibre splice protector suitable for use in high temperatures.

BACKGROUND ART

Optical fibres are glass or plastic fibres designed to guide light along their length by confining as much light as possible in a propagating form. They are widely used in fibre-optic communication, which permits transmission over long distances and high data rates. They are also used to form sensors, and in a wide variety of other applications.

As sensors optical fibres can be used to measure strain, temperature, pressure and other parameters. The small size and the fact that no electrical power is needed at the remote location give the fiber optic sensor advantages over conventional electrical sensors in certain applications. Another advantage is that optical fibres function at very high temperatures and can therefore be used in very high temperature environments, which have, for example, temperatures that are too high for semiconductor sensors to function properly.

Optical fibre sensors have been developed for use in oil, gas or other wells to measure temperature, pressure and other parameters down-hole. Most wells where optical fibres are used have high temperatures of operation which are above 125 degrees Celsius. Many of these wells are heavy oil wells, where the installation of fibre optics is preferred for their use in high temperature environments as they are often used to monitor the temperatures required when steam injection is used to lower the viscosity of the heavy oils.

There are two ways in which to deploy the optical fibre into wells. One way is to deploy the optical fibre through a small metal or high temperature plastic tube, and the tube can then be installed into a well before or after the optical fibre is deployed. Another way is to install the optical fibre cable directly into a well. The optical fibre cable is formed from optical fibres which are inside a metal tube. The optical fibre cable can contain one or several optical fibres. In the first case, optical fibre is continuously installed into the well, but in the second case there is a minimum of one optical fibre splice needed to be made in order to connect the down hole cable and optical fibre sensor together. Carbon coated polyamide optical fibres have been widely used in oil wells which have high temperatures of above 125 degrees Celsius.

Currently when a splice is made on an optical fibre that is to be used directly down-hole in a well, the bare fibre splice is left without any protection after the splice is made. The reason for this is that currently available optical fibre protectors cannot operate at the very high temperatures which are present in wells.

One of the advantages provided by the current invention is that an optical fibre splice protector is provided that can be used in very high temperatures and thus can protect optical fibre splices which are in very high temperature and chemically corrosive environments such as, for example, down-hole in wells. The optical fibre splice protector of the current invention is light, flexible and, as it has its own internal support; it does not require the splice to be supported separately after it has been applied to the optical fibre. In addition, the splice protector can be made on a very small scale and it can easily be integrated with small fibre coils.

DISCLOSURE OF THE INVENTION

According to a first aspect of the invention there is provided an optical fibre splice protector, the splice protector including, a first tube being substantially hollow and being locatable around a portion of the length of at least one optical fibre, the portion including a bare optical fibre splice section of the optical fibre;

a longitudinal support also being locatable along the portion of the length of the optical fibre that includes the bare optical fibre splice section of the optical fibre;

the longitudinal support being enclosable by the first tube along the length of the optical fibre; and the first tube being of high temperature resistant material that is resistant to temperatures above 125 degrees Celsius.

Preferably, the first tube of high temperature resistant material is resistant to temperatures above 125 degrees Celsius and up to 500 degrees Celsius.

In one form of the invention the high temperature resistant material of the first tube is a fluoropolymer material.

The optical fibre splice protector may further include a portion of glue material being enclosed by the first tube. Preferably, the portion of glue material is in the form of a third tube of glue material being substantially hollow and which is locatable around a portion of the optical fibre, the portion including at least the bare optical fibre splice section of the optical fibre.

According to a second aspect of the invention the optical fibre splice protector may further include a second tube being substantially hollow, and being locatable around the optical fibre, between the first tube and the optical fibre, the second tube enclosing the longitudinal support, and being enclosed by the first tube.

According to a third aspect of the invention the optical fibre splice protector may further include a third tube of glue material being substantially hollow and which is locatable around a part of the optical fibre, the part including at least the bare fibre splice section of the optical fibre.

The first tube of high temperature resistant material may be heat shrinkable onto the second tube when heat is applied. In the same way, the second tube may be heat shrinkable onto the longitudinal support and the optical fibre when heat is applied.

Further, the portion of glue material is melted onto the optical fibre when heat is applied. The second tube may be bonded to the optical fibre by the melted glue material after heat has been applied.

In one form of the invention the longitudinal support may be substantially solid. In this case, the longitudinal support may be locatable adjacent to the optical fibre along a portion of its length, the portion including at least the bare optical fibre splice section of the optical fibre.

In another form of the invention the longitudinal support may be a substantially hollow tube. The longitudinal hollow tube may be locatable around a portion of the optical fibre along its length, the portion including at least the bare fibre splice section of the optical fibre.

Further according to the invention, the optical splice protector may be of a size so as to enclose a bare fibre section of a splice which is less than 2.5 millimeters in length. In such a case, the overall length is less than 10 millimeters and the diameter is less than 2 millimeters.

Preferably, the optical fibre splice protector may be used down-hole in a well.

According to a fourth aspect of the invention there is provided a method of forming an optical fibre splice protector, the method including, placing a length of longitudinal support adjacent a bare optical fibre splice section of an optical fibre; and enclosing the bare optical fibre splice section on the optical fibre with a first tube of high temperature resistant material that is resistant to temperatures above 125 degrees Celsius, such that the longitudinal support is also enclosed by the first tube.

Preferably, the first tube of high temperature resistant material is resistant to temperatures above 125 degrees Celsius and up to 500 degrees Celsius.

The method may further include placing a portion of glue material adjacent at least a bare optical fibre splice section of an optical fibre and the longitudinal support, and enclosing both the portion of glue material and the longitudinal tube with the first tube.

In one form of the invention the method may even further include applying heat to the first tube and the glue material, the heat causing the first tube to shrink around the optical fibre and the glue material to melt, the melted glue causing the longitudinal support to become glued to the optical fibre.

Further according to the invention the method may include enclosing the bare optical fibre splice section on the optical fibre with a second tube, the second tube being substantially hollow, and being located between the first tube and the optical fibre, the second tube enclosing the longitudinal support, and the first tube enclosing both the second tube and the longitudinal support. The second tube may be shrunk around the optical fibre, the glue material and the longitudinal support, when the heat is applied to the first tube.

BRIEF DESCRIPTION OF THE DRAWINGS

An embodiment of the invention will now be shown in more detail with reference to the accompanying drawings, in which.

DETAILED DESCRIPTION OF THE INVENTION

In the following description, numerous details are set forth to provide an understanding of the present invention. However, it will be understood by those skilled in the art that the present invention may be practiced without these details and that numerous variations or modifications from the described embodiments may be possible.

Figure 1:
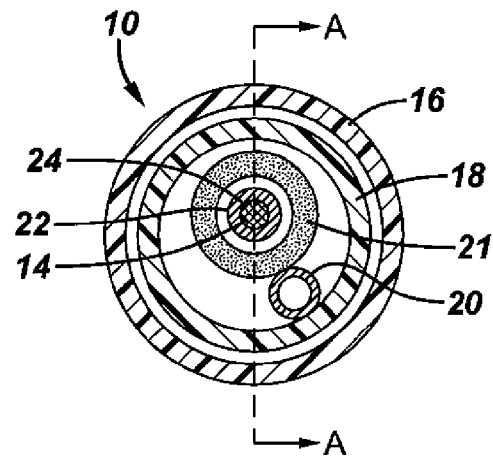
FIG. 1 shows a schematic sectional view through an optical fibre splice protector on a bare optical fibre splice section of an optical fibre, according to the invention.
Figure 2:
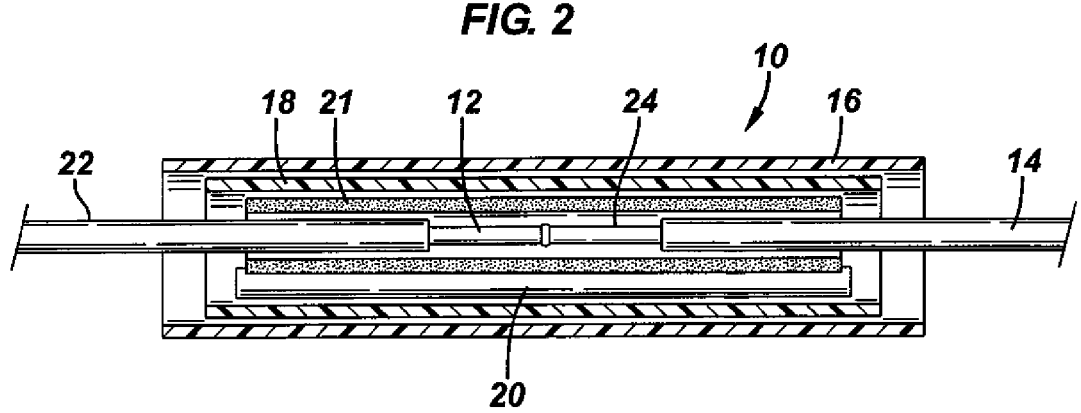
FIG. 2 shows a schematic sectional side view through A-A of the optical fibre splice protector, as shown in FIG. 1.

An embodiment of an optical fibre splice protector 10, according to the invention, which is located around a bare optical fibre splice section 12 on an optical fibre 14, is shown in FIGS. 1 and 2. Optical fibre splice protector 10 can be used in any high temperature application, on an optical fibre which has a high functional temperature. A specific application foreseen for the use of optical splice protector 10 is its use down-hole in wells. Currently temperatures down-hole in oil, gas or other wells, can range between 80 degrees Celsius and 300 degrees Celsius. These wells are however becoming increasingly deeper and the temperatures down-hole will also increase as the depth increases. In addition, wells are now being placed in more environmentally challenging places, some of which involve higher operating temperatures. As a result of this the operating temperatures of down-hole equipment and tools will also need to be increased.

Optical fibre splice protector 10 is operable to sufficiently protect optical fibre splices on optical fibres at the high temperatures that are currently prevalent down-hole in wells, and the higher foreseeable temperatures in the deeper wells or in other high temperature environments.

Splice protector 10 has a first tube 16 of heat shrinkable high temperature resistant material such as, for example, fluoroplastic polymer tubing. This fluoroplastic polymer tubing is resistant to high temperatures that are greater than 125 degrees Celsius up to about 250 degrees Celsius, and is shrinkable by application of heat. Examples of this fluoroplastic polymer material tubing are PVDF, PFA, PTFE, FEP, MFA, or the like. The operating temperatures, for example, for PVDF is up to +175 degrees Celsius, for PFA it is +205 degrees Celsius and for PTFE it is +250 degrees Celsius.

First tube 16 may also be of other high temperature resistant materials such as fiberglass, polymer or rubber material with glass fiber, silica or silicone therein, or ceramics, which are resistant to temperatures up to 350 degrees Celsius or up to 500 degrees Celsius. Preferably the high temperature resistant material of first tube 16 should be heat shrinkable and should have a high level of strength so that it is not easily broken when applied to the bare fibre splice section 12 of an optical fibre 14. The high temperature resistant material of first tube 16 must also not be too heavy, so that it will not cause the optical fibre 14 to break when fibre splice protector 10 is in use on the fibre.

First tube 16 encloses a second tube 18 of hot melting polymer material or thermoplastics, such as, for example, the various types of polyolefins. The most common polyolefins used are polyethylene and polypropylene. The working temperature of tube 18 is generally between −45 degrees Celsius and 125 degrees Celsius.

Second tube 18 encloses a longitudinal metal tube 20, preferably of stainless steel, a glue tube 21, and bare fibre splice section 12 on optical fibre 14. Preferably metal tube 20 has high rigidity and tensile strength, and serves to provide support to bare fibre splice section 12 along its length. Glue tube 21, for example, is made from epoxy resin such as EVA which melts at a temperature of about 102 degrees Celsius and covers the bare fibre splice section 12 forming an adhesive layer around it. Metal tube 20 and second tube are then able to adhere to and become attached to bare fibre splice section 12 when heat is applied.

Bare fibre splice section 12 is formed when optical fibre 14 is cut and two parts thereof are spliced together. In order to achieve this, a small section of polyimide or carbon polyimide coating 22 on optical fibre 14 has to be stripped off to reveal the bare optical fibre 24 for splicing. Even though polyimide coating 22 only has a thickness of about 0.02 mm, it is designed for high temperature operation and is quite difficult to remove. There are several ways in which coating 22 can be removed such as by using, for example, hot sulphuric acid, a high powered laser, or electrical arc discharge. Once coating 22 is removed, the bare optical fibre 24 is cut and two separate bare optical fibres 24 are then spliced together to form the bare fibre splice section 12 shown in FIG. 2.

When using electrical arc discharge in order to remove coating 22, a section of optical fibre 14 of about 1.4 mm is stripped of its coating. The bare optical fibre 24 within this length has a diameter of 0.125 mm, compared to the diameter of 156 mm of the coated optical fibre 14. The bare optical fibre 24 is then cleaved by using a standard fibre cleaver.

Two cleaved bare optical fibres are spliced together by using a commercially available optical fibre splicing machine. After splicing, the bare fibre splice section 12 is left exposed without a coating and splice protector 10 is then applied to optical fibre 14 around bare fibre splice section 12. Splice protector 10 then encloses bare fibre splice section 12, so that optical fibre 14 has mechanical protection in the high temperature and severe chemical environment of a well, down-hole.

Once metal tube 20, glue tube 21, second tube 18 and first tube 16 have been applied to and enclose the bare fibre splice section 12 on optical fibre 14, heat is applied thereto. The heat applied leads to glue tube 21 being melted onto optical fibre 14 and adhering onto bare fibre splice section 12. Second tube 18 is also shrunk onto and around optical fibre 14 by the heat applied. Metal tube 20 is thereby becomes adhered to the melted glue on bare fibre splice section 12 and is enclosed by second tube 18 in a position adjacent along its length to optical fibre 14. The heat applied also shrinks first tube 16 so that it fits snugly around second tube 18. As shown in the FIG. 2, first tube 16 is longer than second tube 18 and it fully encloses second tube 18, even when shrunk onto optical fibre 14 around bare fibre section 12 by the heat applied.

While the invention has been disclosed with respect to a limited number of embodiments, those skilled in the art will appreciate numerous modifications and variations therefrom. It is intended that the appended claims cover such modifications and variations as fall within the true spirit and scope of the invention.

The invention claimed is:

1. An optical fibre splice protector, the splice protector including,
    a first tube being substantially hollow and being locatable along a portion of the length of at least one optical fibre, the portion including a bare optical fibre section of the optical fibre;
    a longitudinal support also being locatable along the portion of the length of the optical fibre that includes the bare optical fibre splice section of the optical fibre;
    the longitudinal support being enclosable by the first tube along the length of the optical fibre;
    the first tube being of high temperature resistant material that is resistant to temperatures above 125 degrees Celsius;
    a second tube being substantially hollow, and being locatable around the optical fibre, between the first tube and the optical fibre, the second tube enclosing the longitudinal support, and being enclosed by the first tube;
    wherein the first tube of high temperature resistant material is heat shrinkable onto the second tube and the second tube is heat shrinkable onto the longitudinal support and the optical fibre when heat is applied.

2. An optical fibre splice protector as claimed in claim 1, wherein the first tube of high temperature resistant material is resistant to temperatures above 125 degrees Celsius and up to 500 degrees Celsius.

3. An optical fibre splice protector as claimed in claim 1, wherein the high temperature resistant material of the first tube is a fluoropolymer material.

4. An optical fibre splice protector as claimed in claim 1, which further includes a portion of glue material being enclosed by the first tube.

5. An optical fibre splice protector as claimed in claim 4, wherein the portion of glue material is in the form of a third tube of glue material being substantially hollow and which is locatable around a portion of the optical fibre, the portion including at least the bare optical fibre splice section of the optical fibre.

6. An optical fibre splice protector as claimed in claim 4, wherein the portion of glue material is melted onto the optical fibre when heat is applied.

7. An optical fibre splice protector as claimed in claim 6, wherein the second tube is bonded to the optical fibre by the melted glue material after heat has been applied.

8. An optical fibre splice protector as claimed in claim 1, wherein the longitudinal support is substantially solid.

9. An optical fibre splice protector as claimed in claim 8, wherein the longitudinal support is locatable adjacent to the optical fibre along a portion of its length, the portion including at least the bare optical fibre splice section of the optical fibre.

10. An optical fibre splice protector as claimed in claim 1, wherein the longitudinal support is substantially hollow.

11. An optical fibre splice protector as claimed in claim 10, wherein the longitudinal support is locatable around a part of the optical fibre along its length, the part including at least the bare optical fibre splice section of the optical fibre.

12. An optical fibre splice protector as claimed in claim 1, which is of a size to enclose a bare optical fibre splice section of an optical fibre, the bare optical fibre splice section being less than 2.5 millimeters in length.

13. An optical fibre splice protector as claimed in claim 1, which has an overall length of less than 10 millimeters and a diameter of less than 2 millimeters.

14. An optical fibre splice protector as claimed in claim 1, which is used down-hole in a well.

15. A method of forming an optical fibre splice protector, the method including,
    placing a longitudinal support adjacent a bare optical fibre splice section of an optical fibre; and
    enclosing the bare fibre splice section on the optical fibre with a first tube of high temperature resistant material that is resistant to temperatures above 125 degrees Celsius, such that the longitudinal support is enclosed by the first tube;
    enclosing the bare optical fibre splice section on the optical fibre and the longitudinal support with a second tube, the second tube being substantially hollow, and being located between the first tube and the optical fibre; and
    heat shrinking the second tube around a part of the optical fibre, the part including the bare optical fibre splice section; and
    heat shrinking the first tube onto the second tube around the optical fibre.

16. A method of forming an optical fibre splice protector as claimed in claim 15, wherein the first tube of high temperature resistant material is resistant to temperatures above 125 degrees Celsius and up to 500 degrees Celsius.

17. A method of forming an optical fibre splice protector as claimed in claim 15, wherein the first tube encloses both the second tube and the longitudinal support.

* * * * *